March 9, 1943. F. M. HEADLEY 2,313,435
FLUID DRIVE CLUTCH
Filed Sept. 18, 1941 2 Sheets-Sheet 2
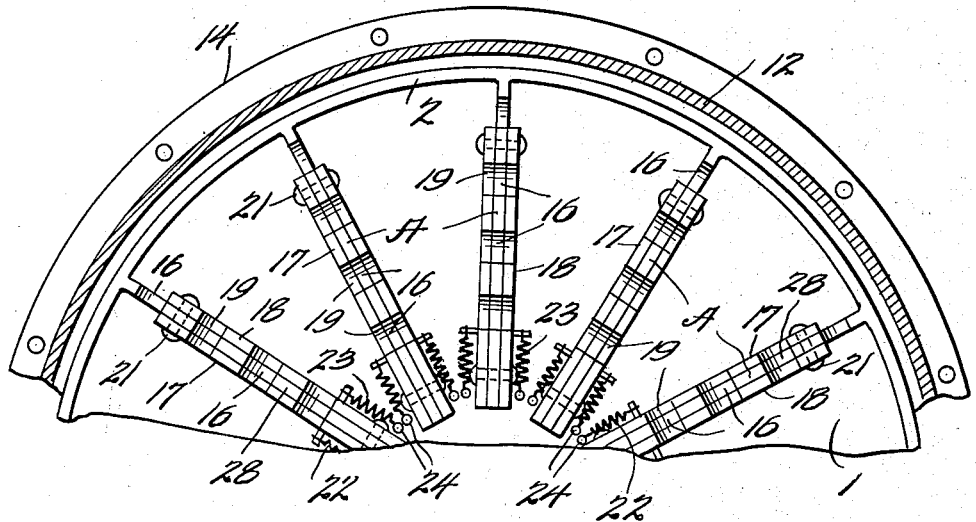
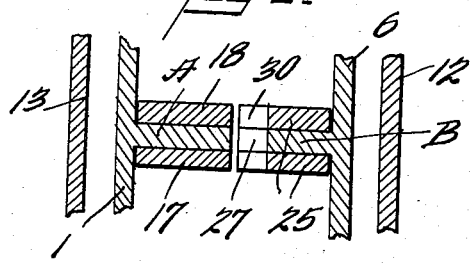
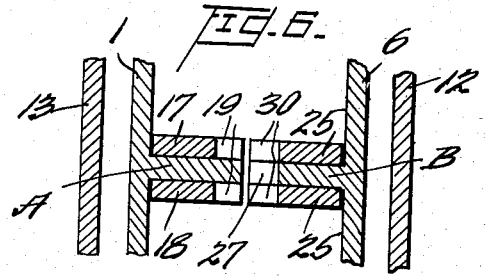
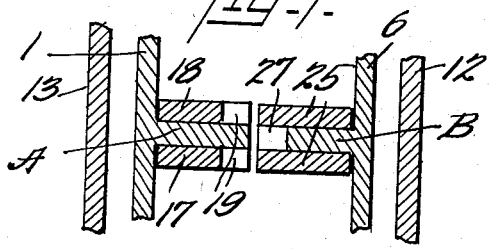
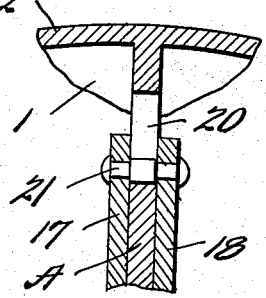
Inventor
Francis M. Headley
By Parker Cook
Attorney Patented Mar. 9, 1943

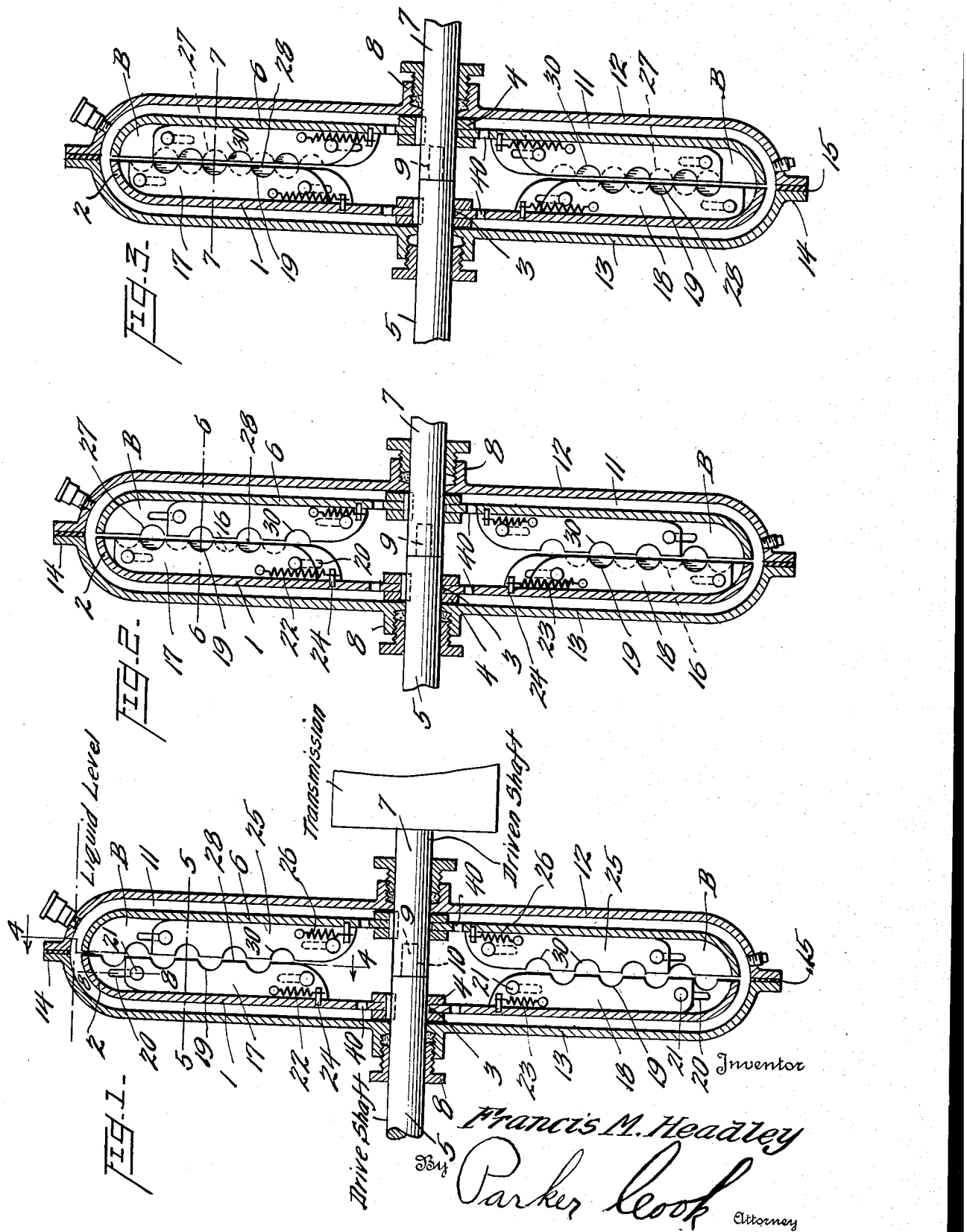

2,313,435

UNITED STATES PATENT OFFICE 2,313,435

FLUID DRIVE CLUTCH

Francis M. Headley, Pleasantville, N. J.

Application September 18, 1941, Serial No. 411,402

13 Claims. (Cl. 60—54)

My invention relates to new and useful improvements in clutches, and more particularly to what is known as a fluid drive clutch.

As is well known to those skilled in the art, one type of fluid drive clutch consists generally of the two members having faces, each of which is provided with various types of vanes or baffles, while various means are utilized for varying the proximity of the clutch faces and vanes or baffles so that at an idling speed of the motor the fluid in the clutch may be by-passed and thus not act on the driven face of the clutch—but on a speeding up of the motor and its respective clutch face, the fluid in the clutch is forced against the vanes or baffles of the driven face portion of the clutch to thus impart the driving force from the motor to the driven shaft.

One of the principal objects of the present invention is to provide a simplified fluid drive clutch which will also permit of a greatly simplified transmission, and also provide an automatic variable driving power ratio which will be very effective and efficient in operation.

Still another object of the invention is to provide a simplified and improved type of fluid coupling which will allow for the variable driving power ratio without the use of the ordinary variable gear transmission and other clutch control mechanisms.

Still another object of the invention is to provide a fluid clutch which assures a perfect neutral action at idling speeds, and will permit of a simplified gear transmission mechanism which will be reduced to one forward and reverse gear, which may be shifted freely by a small lever control on the steering column.

Still another object of the invention is to provide a fluid clutch wherein the normal clutch pedal is eliminated, so that one foot may be kept on the brake pedal and the other kept on the accelerator, thus making it unnecessary to shift the foot in the driving of the car.

Still another object of the invention is to provide an extremely simplified form of fluid clutch drive wherein there are fixed and movable vanes, the movable vanes being moved outwardly and inwardly radially of the clutch, depending upon the speed of the motor and driven shaft.

Still another object of the invention is to provide a simplified fluid drive clutch wherein movable radial vanes on both the respective faces of the clutch are moved outwardly by centrifugal force to thus effectively couple the drive shaft of the motor with the driven shaft of the motor vehicle, and as the revolutions of the motor are stepped up, so likewise will the revolutions of the driven shaft be sped up, as the by-pass of the oil between the vanes of the respective clutch faces is automatically cut down.

Still another object of the invention is to provide a fluid clutch for motor vehicles wherein the respective two faces of the clutch are provided with opposite fixed vanes with certain apertures formed therein, while mounted for radial movement on these respective fixed vanes are movable vanes which will be forced radially outwardly to couple effectively the two faces as the speed of the motor is increased.

Still another object of the invention is to provide a fluid coupling which permits the driven shaft to remain stationary at an idling speed of the motor, but will progressively cut off the by-passing of the oil between the vanes up to, say, thirty-five or forty miles per hour speed of the vehicle, after which the oil in the clutch between the respective vanes will cease to be by-passed so that for higher speeds, an effective coupling is obtained and the forward gear ratio might be said to be comparable to the present overdrive ratio of automobiles now in use.

Still another object of the invention is to provide a fluid drive clutch wherein there may be obtained a very efficient braking action by decelerating the motor and letting the compression of the motor act as a brake.

With these and other objects in view, the invention consists in certain new and novel arrangements and combination of parts as will be hereinafter more fully described and pointed out in the claims.

Referring now to the drawings showing a preferred form of the invention,

Fig. 1 is a vertical sectional view showing the respective halves of the clutch and the movable vanes in their normal position;

Fig. 2 is a similar view but showing the movable vanes on the drive face of the clutch as having moved radially to their outermost position to thereby partly restrict the by-pass of oil between these vanes and the cooperating vanes on the driven face of the clutch;

Fig. 3 is a similar view showing the respective movable vanes of both faces of the clutch as having been moved by centrifugal force to their outermost position to effectively cut off the by-passing of the oil between the respective vanes;

Fig. 4 is a fragmentary sectional view taken on line 4—4 of Fig. 1 looking in the direction of the arrows;

Fig. 5 is an enlarged fragmentary sectional view taken on line 5—5 of Fig. 1;

Fig. 6 is an enlarged fragmentary sectional view taken on line 6—6 of Fig. 2;

Fig. 7 is an enlarged fragmentary sectional view taken on line 7—7 of Fig. 3 showing how the by-pass of the oil is cut off when the movable vanes on both faces of the clutch have moved to their outermost position; and Fig. 8 is a fragmentary detail view taken on line 8—8 of Fig. 1 showing how the slidable vanes are pinned through the permanent vanes.

Referring now for the moment to Fig. 4, there is shown a fragmentary portion of one face of the clutch, to wit, the drive face of the clutch, but it is to be understood at the outset that the cooperative driven face is similar with the exception that on the driven face of the clutch the fixed vanes are slightly longer and the movable vanes are positioned nearer the center.

Still referring to Fig. 4 and also to Fig. 1, there may be seen the circular plate or clutch face 1, which is provided with the inwardly extending flange 2 and the central opening 3 in which is fitted a housing 4 in which is secured the drive shaft 5 from the motor (not shown). It will be understood that any form of locking means may be utilized, for locking this clutch face to the drive shaft, and for preventing the oil from escaping out along the drive shaft.

There is also shown the driven clutch plate 6 which corresponds in outline to its cooperating plate 1, and is to be likewise secured to the driven shaft 7.

I have also shown two oil glands 8 on the respective shafts 5 and 7 to prevent the leakage of oil, and it will be understood that any desirable form may be used, as those shown are merely for the purpose of illustration.

Likewise, I have shown a trunnion 9 on the end of the drive shaft 5, which will turn freely within a receptive opening 10 in the driven shaft, which will tend to keep the two shafts in alignment.

It will also be understood that the two clutch faces are in relatively close proximity but their respectively inwardly turned flanges do not contact to thus avoid any friction. Oil will be forced out between the flanges into the surrounding oil chamber 11, which is formed by the two stationary plates 12 and 13, which follow in contour the aforementioned clutch plates but are relatively larger, to enclose the said clutch faces, as may be readily seen.

There is also shown a flange 14 with its gasket 15, so that the respective halves of this oil chamber may be tightly bolted together.

Referring now for the moment to Fig. 4, there may be seen a plurality of the fixed radially extending vanes A which are spaced at any desired intervals on the inner surface of the drive face of the clutch. This whole clutch face or plate may be an integral casting with the fixed vanes likewise cast integral, and these vanes will be provided with a plurality of semi-circular cutout portions 16 which cutouts are spaced along the outer edges of the vanes, as may also be seen from Figs. 1, 2 and 3.

Associated with these fixed vanes are movable vanes and a description of the one fixed vane and the two movable vanes will be a description of the others.

Still referring to Fig. 4, there may be seen a movable or slidable vane 17, and directly opposite and to the other side of the fixed vane A is the movable vane 18.

The vanes 17 and 18 are also identical and are likewise provided with the semi-circular cutout portions 19 along their outer edge. The height of these vanes (Fig. 4) is the same as the height of the fixed vanes A, so that when the movable vanes are in their normal position (Figs. 1, 4 and 5) the cutouts 16 of the fixed vane A will be in registry with the cutouts 19 in the movable vanes 17 and 18.

Each of the fixed vanes A is slotted near its opposite ends as at 20. The radially movable vanes 17 and 18 are permanently pinned together by the pins 21 which pass through the aforementioned slotted openings 20 of the fixed vanes. There will, of course, be sufficient clearance between the fixed vane and the movable vanes to permit a free radial movement of the movable vanes along the said fixed vane.

Also secured to the movable vane 17 is the spring 22 and likewise to the vane 18 is pinned the spring 23, the opposite ends of the springs being pinned to the clutch face 1 as at 24. The tension of these springs on these movable vanes 17 and 18 is such that they normally hold these radilaly movable vanes in their innermost position—that is, towards the hub.

Looking at Fig. 1 for the moment, it will be seen that the weight of the vanes in the upper half of the circle will also act with the springs to hold the vanes in their normal or innermost position, and in the lower half of the circle the vanes will be held in their innermost position wholly by the tension of the springs. It will be understood that the springs shown are merely illustrative, and springs with the desired tension will be utilized.

As far as the description of the vanes has proceeded, it will be seen that there are a plurality of radially extending fixed vanes on the opposite sides of which are the movable vanes, all of which are provided with cutout portions for the by-passing of the fluid in the clutch, and all of which by-passes are in registry when the clutch face is in a stationary position.

Now the opposite clutch face 6 (the driven clutch face) is similar in that there are the same radially extending fixed vanes B, while on the opposite sides of the fixed vanes in the same manner as in the clutch face 1 are the slidable vanes 25 that are held in their normal position by the springs 26 and are pinned for movement in the same way the previously mentioned vanes are pinned.

It will be noticed that these fixed vanes B are slightly longer than the fixed vanes A. It is also to be noticed that the cutout portions 27 in the fixed vane are disposed opposite the straight edges 28 of the fixed vanes A so that the semi-circular openings of the fixed vane A and its movable vanes 17 and 18 are in staggered relation with the registered openings of the fixed vane B and the openings 30 in the movable vanes which are slidingly attached to the fixed vane B.

Thus, when the motor is idling and at a relatively low speed, the oil will be by-passed through these staggered semi-circular openings between the respective vanes on the two clutch faces.

It might be mentioned here that the springs 31 on the movable vanes 25 of the driven face of the clutch may be of greater tension than the springs 22 and 23, if found desirable.

Also, there may be noticed a plurality of openings 40 around the inner periphery of the two clutch faces 1 and 6, so that the oil driven by centrifugal force between the two clutch faces out into the oil chamber may flow back through these openings between the two clutch faces, and thus relieve any pressure that might otherwise be caused in the outer oil chamber.

The clutch is filled with oil, the liquid level being shown in Fig. 1.

Having explained the structure, the operation would be as follows:

On an idling or relatively low speed of the motor (not shown) the drive shaft 5 will revolve the clutch face 1 and the movable vanes 17 and 18 will be in the normal position as shown in Fig. 1 and the movable vanes on the driven face of the clutch will also be in the position as shown in Fig. 1, and the oil will by-pass through these staggered openings as will be readily understood.

As the drive shaft is revolved at a greater speed, the movable vanes 17 and 18 will move out radially by the centrifugal force exerted thereon, so that the cutout portions 19 in the movable vanes are no longer in registry with the cutout portions 16 of their fixed vane A, and the movable vanes will move to the position shown in Figs. 2 and 6, so that now the fluid will not be by-passed along the edges of the fixed and movable vanes on the drive clutch face A, but may only pass through the registered openings of the fixed vanes B and their movable vanes, as may be readily understood from Fig. 6.

Thus, there will be a fluid coupling between the two faces of the clutch, and the car will travel at a low speed.

As the motor is accelerated and the driven face of the clutch gains speed, its movable plates will also be acted upon by the centrifugal force until they reach the position shown in Figs. 3 and 7 of the drawings, so that not only now is the by-pass of oil cutout from the driving face of the clutch, but likewise the openings between the movable vanes and fixed vanes of the driven face of the clutch are not in registry, so that the fluid being acted on by the driven face will impart the pressure to the vanes of the driven face and thus effectively couple the drive shaft with the driven shaft.

Thus, between a slow driven speed and up to thirty-five miles per hour, there will be in effect a variable gear ratio, and from thirty-five miles per hour up, all the movable vanes will be in their outermost position, and speaking functionally none of the oil is by-passed until the motor is again decelerated, or the revolving speed of the fluid clutch mechanism is greatly reduced.

By having movable vanes on the opposite sides of all the fixed vanes, the pressure from the oil will be exerted against all the respective movable vanes to one side of the fixed vanes when the clutch is acting as a drive coupling between the driving and driven shafts, and on a deceleration of the motor when the driving face is tending to hold back the driven face, the pressure from the oil will be on all the vanes on the opposite sides of the fixed vanes.

Thus it can be seen that the form of fluid drive thus described makes a very efficient coupling for the driving of the car, and likewise makes an efficient coupling when it is desired to retard the motion of the car by decelerating the motor and its driving face or, in other words, utilizing the motor compression for braking action.

I have also found that with the form of fluid clutch above described, it will only be necessary to have a simplified transmision consisting of a reverse gear and one forward speed, and the car will be under perfect control of the driver by the manipulation of the accelerator and speeding or retarding the rotations of the engine.

From the foregoing it will be seen that I have provided a form of fluid clutch which is wholly automatic in that the rate of speed of the engine controls the radial movement of the movable vanes on one face of the clutch, and likewise the movement of the movable vanes on the driven face of the clutch will also be automatically actuated by the centrifugal force exerted on this driven face.

Inasmuch as the movable vanes are encased in oil, there will be practically no wear on the clutch.

Finally, it will be understood that I do not wish to be limited to the size or shape of the openings in the movable and fixed vanes, nor to the amount of by-pass clearance, nor to the manner of attaching the movable vanes to the fixed vanes, nor to the manner in which the springs hold the vanes in their normal position.

Also, it will be understood that some oil will pass between the clutch faces, even when in their fully coupled position, and out into the oil chamber. This will be returned through the openings 40.

Having described my invention, what I claim as new and desire to secure by Letters Patent is:

1. A fluid drive clutch, including a drive face, radially disposed fixed vanes on the inner surface thereof, radial movable vanes pinned to the respective fixed vanes, and the fixed and movable vanes having registerable cut-out portions to by-pass a portion of the fluid when the movable vanes are in their normal position; together with a driven face likewise having corresponding fixed and movable vanes cooperating with the vanes on the drive face, and the movable vanes on the driving face adapted to move radially outwardly when said driving face is rotated to thus cause the cut-out portions of the movable and fixed vanes of said face to be non-registering, and thus stop the by-passing of fluid therethrough, and to cause the fluid in said clutch to thereby act on the vanes of the driven face of said clutch, to thereby rotate said driven face.

2. A fluid drive clutch, including a drive face, radially disposed fixed vanes on the inner surface thereof, radial movable vanes pinned to the respective fixed vanes, and the fixed and movable vanes having registerable cut-out portions to by-pass a portion of the fluid when the movable vanes are in their normal position; together with a driven face likewise having corresponding fixed and movable vanes cooperating with the vanes on the driven face and these said last-mentioned fixed and movable vanes also provided with cut-out portions registering when the said movable vanes are in their normal position, and the movable vanes on the driving face and the movable vanes on the driven face adapted to move radially outwardly when said driving face and said driven face are rotated at certain speeds to thus cause the respective cut-out portions on the movable vanes on both the driving and the driven faces to be respectively non-registering with the respective cut-out portions on their fixed vanes and thus stop the by-passing of the fluid and effectively couple the driving face with the driven face.

3. A fluid drive clutch, including a drive face, radially disposed fixed vanes on the inner surface thereof, radial movable vanes pinned to the opposite sides of the respective fixed vanes, and the fixed and movable vanes having registerable cutout portions to by-pass a portion of the fluid when the movable vanes are in their normal position, spring means for holding the said movable vanes in their normal position, together with a driven clutch face likewise having corresponding fixed and movable vanes pinned to the opposite sides of its fixed vanes, and said last-mentioned movable and fixed vanes cooperating with the like vanes on the driving face of the clutch, the movable vanes on the driving face adapted to move radially outwardly by centrifugal force when said driving face is rotated, and thus cause the cut-out portions of the movable and fixed vanes of said clutch face to be non-registering and stop the by-passing of fluid therethrough, and the movable vanes on the driven face of said clutch likewise adapted to be acted on by centrifugal force and to move radially outwardly and thus stop the by-passing of fluid through its vanes, and thereby cause an effective fluid coupling between the two said clutch faces.

4. A fluid drive clutch including two cooperating clutch faces, each of said faces having radially extending cooperating fixed vanes on its inner adjacent surfaces, the said fixed vanes having by-passing apertures formed therein, movable vanes associated with each of the said fixed vanes, and likewise provided with by-passing apertures adapted to register with the apertures of their respective fixed vanes, all of said movable vanes adapted to be radially acted upon by centrifugal force when the clutch faces are revolved to thereby cut off the by-passing of oil between the fixed vanes of the two clutch faces and cause an effective coupling between the two said clutch faces.

5. A fluid drive clutch including driving and driven cooperating clutch faces, each of said faces having radially extending cooperating fixed vanes on its inner adjacent surfaces, the said fixed vanes having by-passing apertures formed therein, movable vanes associated with each of the said fixed vanes, and likewise provided with the by-passing apertures adapted to register with the apertures of their respective fixed vanes, the apertures in the fixed vanes of the driven face being in staggered relation with the apertures in the fixed vanes of the driving face, the movable vanes on the driving face adapted to be moved radially to partially cut off the by-passing of the oil between the two faces on a rotation of the driving face, and the movable vanes on the driven face likewise being radially actuated by centrifugal force to further stop the by-passing of the oil between the fixed vanes of the two faces after the driven face has reached a certain speed of rotation with relation to the driving face.

6. A fluid drive clutch, including a driving face and a cooperative driven face, each of said faces provided with cooperating fixed vanes and the said fixed vanes having apertures in staggered relation with each other for by-passing the oil between the fixed vanes of the two faces, means actuated by centrifugal force due to rotation of the driving face for automatically closing the apertures of the fixed vanes of the driving face and means also actuated by centrifugal force due to rotation of the driven face for automatically closing the apertures of the fixed vanes of the driven face, after the closing of the apertures of the fixed vanes of the driving face.

7. In a fluid drive clutch a drive face, said face provided with integral outstanding radially disposed fixed vanes having apertures formed therein, slidable vanes disposed on the opposite sides of each of the fixed vanes, said slidable vanes also provided with apertures and means for holding the slidable vanes so that their apertures normally register with the apertures in their respective fixed vanes, and said slidable vanes adapted to move radially outwardly on rotation of the drive face to thereby close the apertures in the fixed vanes.

8. A fluid clutch drive, including a drive face and a driven face located in close proximity to each other, each of the faces provided with a series of fixed vanes with their adjacent edges being in close proximity to each other when the clutch is assembled, by-pass apertures formed in the respective fixed vanes, means associated with the respective fixed vanes for first automatically cutting off the apertures in one series of vanes and then cutting off the apertures in the other series of vanes on the rotation of the respective clutch faces.

9. In a fluid clutch drive a driven face, fixed vanes extending radially thereof and provided with by-passing apertures, movable vanes associated therewith, and the said movable vanes adapted to close the said apertures in the fixed vanes when the rotation of the driven face reaches a certain rotative speed.

10. A fluid clutch drive, including a drive face and a driven face, each of the faces provided with a series of radially extending fixed vanes, each of the vanes also provided with by-passing apertures, and means associated with the fixed vanes and actuated by centrifugal force for progressively cutting off first the by-passes in the series of fixed vanes on the driving face and then cutting off the by-passing apertures in the vanes in the driven face, to thus form an effective fluid coupling between the two faces.

11. In a fluid clutch drive a driving and driven face having fixed vanes extending in close proximity to each other, said vanes being provided with by-passing cut-out portions, radial movable means associated with the fixed vanes for cutting off said by-passes on relatively high rotative speeds of the said two faces, and further means for holding said cut-off means normally in an inoperative position on relatively low rotative speeds of the two clutch faces.

12. In a fluid clutch drive a driving and driven face having fixed vanes extending in close proximity to each other, said vanes being provided with by-passing cut-out portions, radial movable cut-off means associated with the fixed vanes on the drive face for cutting off said by-passes when a certain rotative speed is reached, additional means for holding said cut-off means on the driven face normally in an inoperative position until said driven face likewise reaches a certain rotative speed due to the fluid coupling between the two said faces.

13. In a fluid clutch drive a driving and driven face having fixed vanes extending in close proximity to each other, said vanes being provided with by-passing cut-out portions, radial movable cut-off means associated with the fixed vanes on the drive face for cutting off said by-passes when a certain rotative speed is reached, radial movable cut-off means also associated with the fixed vanes on the driven face for cutting off the by-passes in the vanes in the driven face when a certain rotative speed is reached due to the fluid coupling between the vanes on the driving and driven face.

FRANCIS M. HEADLEY.